United States Patent [19]

Sakurai

[11] Patent Number: 5,562,350

[45] Date of Patent: Oct. 8, 1996

[54] OUTPUT APPARATUS THAT SELECTS A VECTOR FONT BASED ON CHARACTER SIZE

[75] Inventor: Masakatsu Sakurai, Yokohama, Japan

[73] Assignee: Canon Kabushiki Kaisha, Tokyo, Japan

[21] Appl. No.: 344,630

[22] Filed: Nov. 17, 1994

Related U.S. Application Data

[63] Continuation of Ser. No. 51,802, Apr. 26, 1993, abandoned, which is a continuation of Ser. No. 703,711, May 21, 1991, abandoned, which is a continuation of Ser. No. 338,627, Apr. 17, 1989, abandoned.

[30] Foreign Application Priority Data

Apr. 18, 1988 [JP] Japan ................................ 63-95844
Apr. 18, 1988 [JP] Japan ................................ 63-95848

[51] Int. Cl.⁶ ........................................... G06F 3/00
[52] U.S. Cl. .................... 400/61; 400/76; 345/128; 345/143; 395/151
[58] Field of Search ................ 400/61, 76; 345/127, 345/128, 129, 130, 132, 135, 143, 144; 395/102, 109, 110, 128, 150, 151

[56] References Cited

U.S. PATENT DOCUMENTS

| | | | |
|---|---|---|---|
| Re. 30,679 | 7/1981 | Evans et al. ........................ | 235/151 |
| 4,331,955 | 5/1982 | Hansen .............................. | 340/739 |
| 4,359,286 | 11/1982 | Barnes ............................... | 340/735 |
| 4,553,214 | 11/1985 | Dettmer ............................. | 364/521 |
| 4,573,199 | 2/1986 | Chen ................................. | 340/731 |
| 4,630,039 | 12/1986 | Shimada ............................ | 340/731 |
| 4,633,243 | 12/1986 | Bresenham ........................ | 340/740 |
| 4,675,830 | 6/1987 | Hawkins ............................ | 364/518 |
| 4,682,161 | 7/1987 | Bugg ................................. | 340/735 |
| 4,686,525 | 8/1987 | Nagata .............................. | 340/790 |
| 4,785,391 | 11/1988 | Apley ................................ | 340/723 |
| 4,827,358 | 5/1989 | Matsumoto ....................... | 340/730 |
| 5,398,311 | 3/1995 | Seto ................................... | 395/151 |

FOREIGN PATENT DOCUMENTS

| | | | |
|---|---|---|---|
| 237676 | 10/1986 | Japan ................................. | 400/18 |
| 279575 | 12/1986 | Japan ................................. | 400/17 |
| 218141 | 9/1987 | Japan ................................. | 400/121 |

*Primary Examiner*—Edgar S. Burr
*Assistant Examiner*—Steven S. Kelley
*Attorney, Agent, or Firm*—Fitzpatrick, Cella, Harper & Scinto

[57] ABSTRACT

A character output apparatus outputs characters of arbitrary size with vector character fonts, in which the vector character font is associated with data indicating the effective size range and alternative font to be used outside the effective size range, in order to obtain clear character output in any size.

7 Claims, 7 Drawing Sheets

OUTPUT APPARATUS THAT SELECTS A VECTOR FONT BASED ON CHARACTER SIZE

This application is a continuation, of application Ser. No. 08/051,802, filed Apr. 26, 1993, now abandoned, which was a continuation of application Ser. No. 07/703,711, filed May 21, 1991, now abandoned, which was a continuation of application Ser. No. 17/338,627, filed Apr. 17, 1989, now abandoned.

BACKGROUND OF THE INVENTION

1. Field of the Invention

The present invention relates to an output apparatus for the output of characters or symbols with a vector character font.

2. Related Background Art

Conventional character output with a vector character font has been conducted with vector character patterns of a same style regardless of the character size.

However, in such conventional technology in which characters of all sizes are formed from a vector character pattern of a same style, small characters are easily filled in and become illegible in certain styles, such as bold gothic.

Also, said conventional technology has been associated with following drawbacks, as characters of all sizes are formed from a vector character pattern even in cases of a complicated character:

(1) Formation of a small character gives rise to fusion of lines to be separated, or a void in a line; and (2) Image quality is deteriorated in a large character size, if the vector character pattern is simplified in complex portion. Also in the conventional technology, the characters smaller than a predetermined size are formed in combination with a dot font, so that the external form of a character or the freedom of deformation, such as slanted style, may be different from those of larger sizes.

SUMMARY OF THE INVENTION

In consideration of the foregoing, an object of the present invention is to provide an output apparatus in which each vector character font is provided with an effective size range of character generation and with information on vector character font of a style to be used outside said effective size range, thereby enabling character output with an optimum vector character font according to the character size.

Another object of the present invention is to provide an output apparatus having plural vector character patterns for each character, and being capable of selecting a suitable one from said plural patterns for character generation according to the size of the character to be formed, thereby forming characters of high image quality from small to large character sizes, or thereby facilitating deformation of characters.

DETAILED DESCRIPTION OF THE PREFERRED EMBODIMENTS

Now the present invention will be clarified in detail by an embodiment shown in the attached drawings. Said embodiment is the application to a printing apparatus such as a page printer, as an example of the output apparatus.

The vector character font or pattern used in the present invention indicates data indicating a group of coordinate points which do not represent dot signals but contour information of a character or a pattern, and may be called outline font or vector font. However the font is not limited to such data but can be any signals, such as run-length signals, which are compressed compared to the bit map (dot signals).

Figure 1:
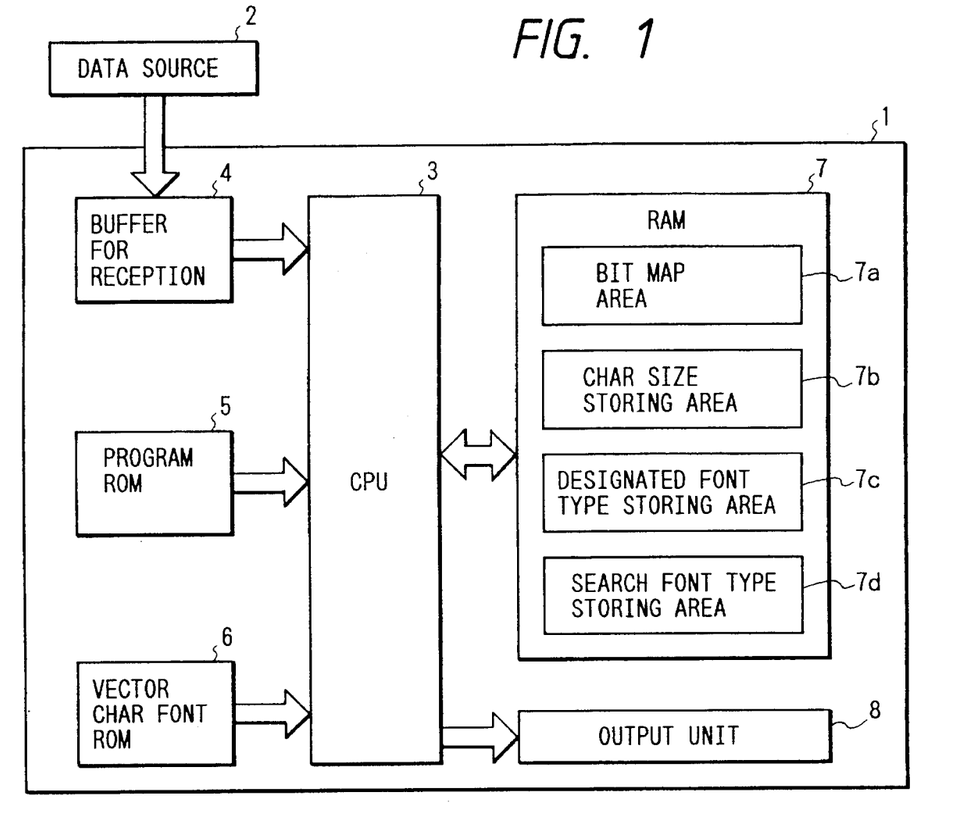
FIG. 1 is a block diagram of an embodiment of the present invention.

FIG. 1 is a block diagram best showing the features of the present invention, in which is shown a main body 1 of the printing apparatus; a data source 2 such as an external host computer; a CPU 3 for controlling the various units of the printing apparatus; a reception buffer 4 for storing data from said data source 2; a program ROM 5 storing the programs corresponding to the flowcharts to be explained later in relation to FIGS. 3 and 4; a vector character font ROM 6 storing vector character patterns corresponding to the character codes entered into the reception buffer 4 (in fact storing plural vector character fonts shown in FIG. 2); and a RAM 7 used as a work area in the program execution of the CPU 3. Said RAM 7 is provided with a bit map area 7a for storing print data for character output; a character size memory area 7b for storing the character size to be printed; a designated style memory area 7c for storing the designated print style; and a style memory area 7d for storing the font style to be selected in the vector character font ROM 6. There is also provided an output unit 8 for printing the print data stored in the area 7a.

Figure 2:
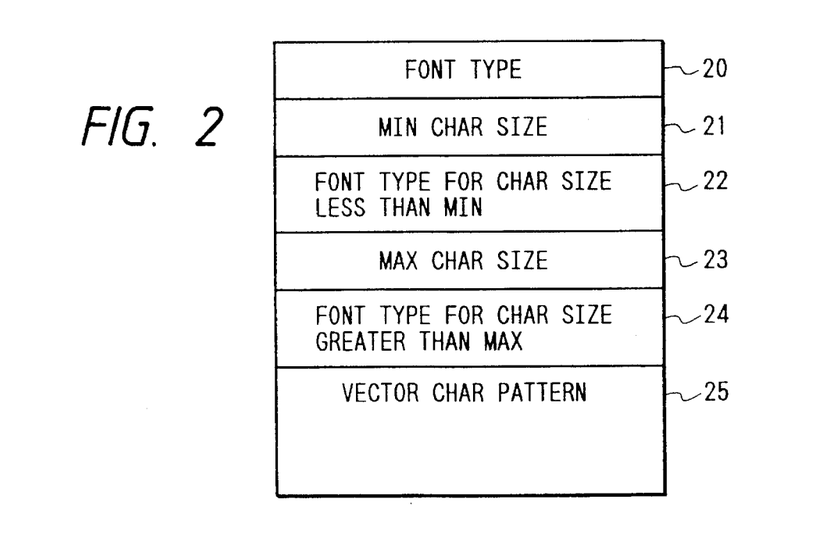
FIG. 2 is a schematic view of the structure of vector character font of said embodiment.

FIG. 2 shows the structure of one of the plural vector character fonts stored in the vector character font ROM 6. An area 20 stores the style of the vector character font in an encoded form. An area 21 stores the minimum character size that can be generated with the vector character size 25 to be explained later, in an encoded form. An area 22 stores, in an encoded form, a print style below said minimum character size, indicating the vector character font to be selected when a character size below said minimum character size 21 is designated. An area 23 stores, in an encoded form, the maximum Character size that can be generated with the vector character size 25 to be explained later. An area 24 stores, in an encoded form, a print style above said maximum character size, indicating the vector character font to be selected when a character size above said maximum character size 23 is designated. An area 25 stores vector character font patterns of the style 20, in correspondence to character codes.

Figure 3:
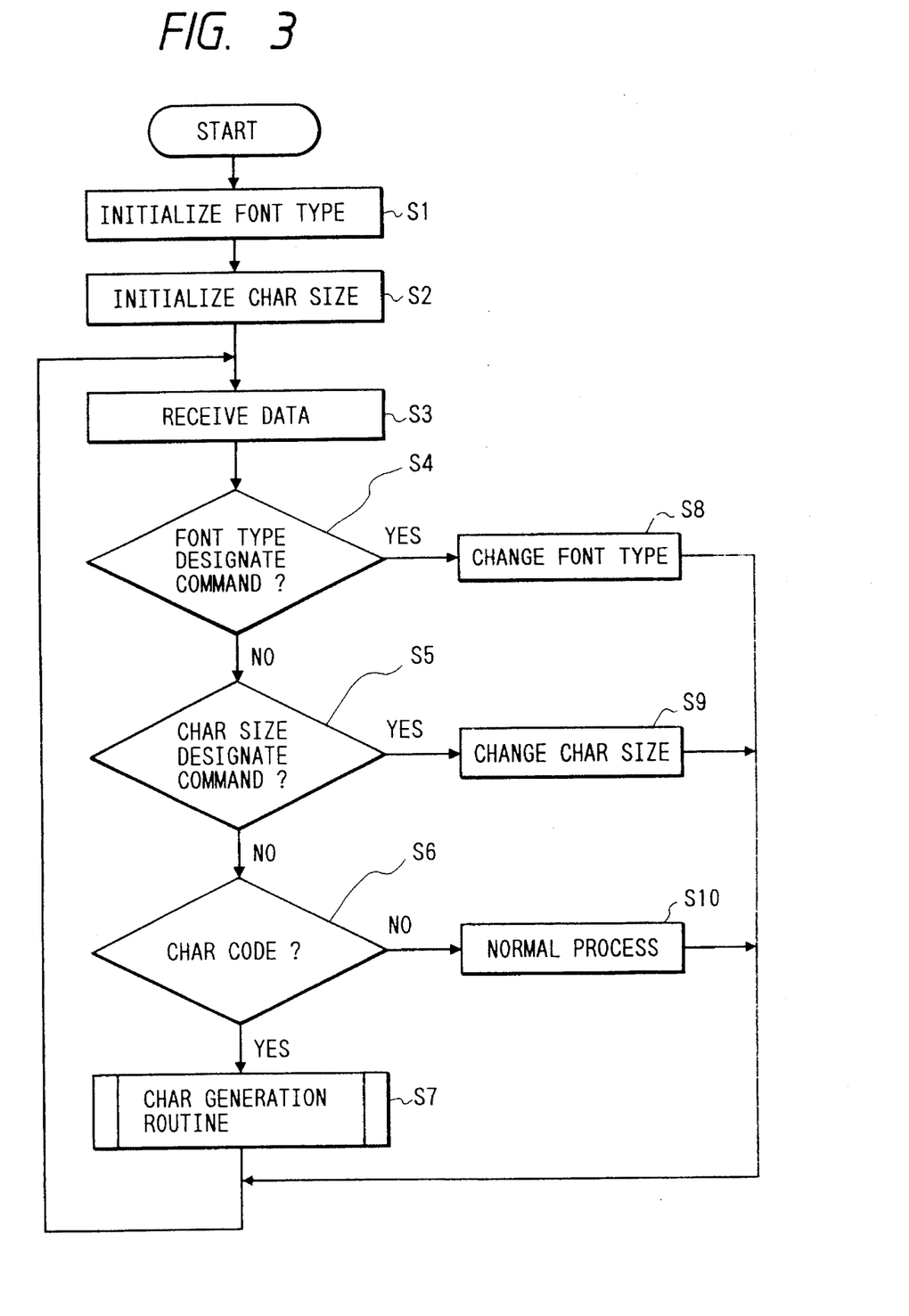
FIG. 3 is a main flowchart of the control sequence of said embodiment.
Figure 4:
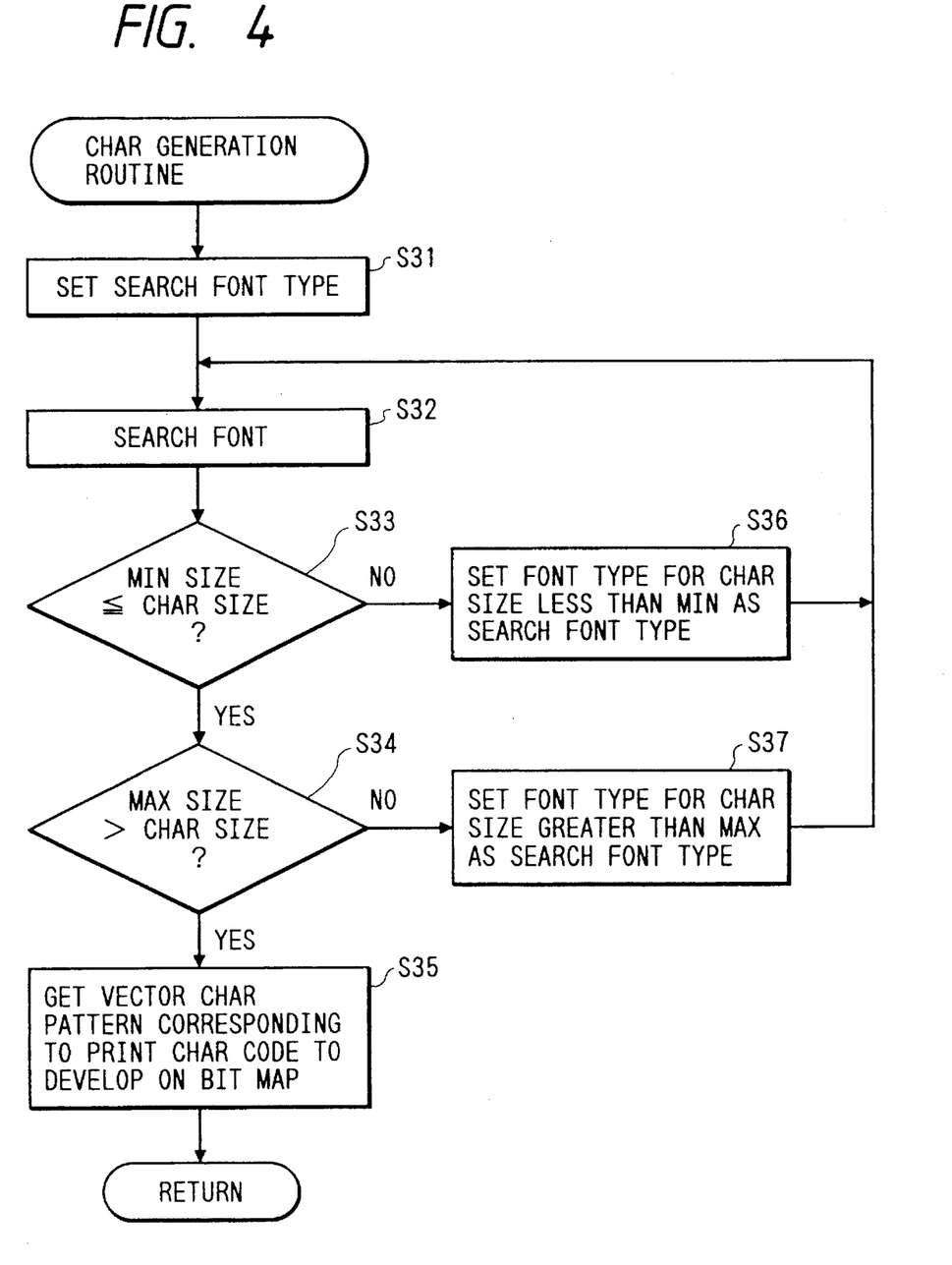
FIG. 4 is a subsidiary flowchart of the control sequence of said embodiment.

FIGS. 3 and 4 are flowcharts of the control sequence of a printing apparatus constituting an application of the present embodiment. In the following, the function of the present embodiment will be explained with reference to these flowcharts.

When the power supply to the apparatus is started, a step S1 stores a default style, in an encoded form, in the designated style memory area 7c of the RAM 7. Then a step S2 stores an initial value of the character size in the character size memory area 7b of the RAM 7. A step S3 receives the data from the data source 2, stores the received data in the reception buffer 4, and reads data of a unit code from said reception buffer. Then a step S4 discriminates whether said data are an instruction designating the font style, and, if not, a step S5 discriminates whether said data are an instruction designating the character size. If not, a step S6 discriminates whether said data are a character code or a control code (such as a code for line feed or carriage return). If said data are identified as a character code, the sequence proceeds from the step S7 to a character generation routine shown in FIG. 4.

In said routine, at first a step S31 reads the encoded style stored in the designated style memory area 7c, and stores said style in the searched style memory area 7d. Then a step S32 searches, among the vector character fonts stored in the vector character font ROM 6, the one coinciding with the encoded style stored in the area 7d. Then a step S33 compares the minimum character size 21 of the font searched in the step S32 with the designated character size stored in the character size memory area 7b. If the minimum character size 21 is equal to or smaller than the designated character size, a step S34 compares the designated character size with the maximum character size 23 of the font searched in the step S32. If the designated character size is smaller than the maximum character size 23, the sequence proceeds to a step S35 to obtain a vector character pattern, corresponding to the character code received in the step S3, from the vector character patterns 25 of the font searched in the step S32 and to generate, in the bit map area 7a, a character with a size stored in the character size memory area 7b, and the sequence returns to the main routine. On the other hand, if the step S33 identifies that the minimum character size 21 is larger than the designated character size, the sequence proceeds to a step S36 for storing, in an encoded form in the style memory area 7d, the style 22 to be selected below the minimum character size of the font searched in the step S32, and the sequence then returns to the step S32. If the step S34 identifies that the maximum character size 23 is equal to or smaller than the designated character size, the sequence proceeds to a step S37 for storing, in an encoded form in the searched style memory area 7d, the style 24 to be selected above the maximum character size of the font searched in the step S32, and the sequence returns to the step S32.

After the completion of the character generation routine in the step S7, the sequence returns to the step S3. If the step S4 identifies a style designating instruction, a step S8 stores, in an encoded form, the designated style in the designated style memory area 7c, and the sequence returns to the step S3. Also if the step S5 identifies a character size designating instruction, a step S9 stores the designated character size in the character size memory area 7b, and the sequence returns to the step S3. Also, if the step S6 does not identify a character code, a step S10 executes an ordinary process (line feed, carriage return, form feed, etc., according to the control code), and the sequence returns to the step S3.

Though the foregoing description has been limited to an application to a printing apparatus such as a page printer, but the foregoing embodiment is easily applicable to any character display apparatus including a display unit such as a cathode ray tube and designed for character display with a vector character font.

As explained in the foregoing, in a character output apparatus for generating characters in an arbitrary size with vector character font, each font is given an effective size range of character generation and information on the vector character font to be used for character generation outside said effective size range, whereby characters can be generated even to a small size in which reproduction of characters tends to become unsatisfactory.

Figure 5:
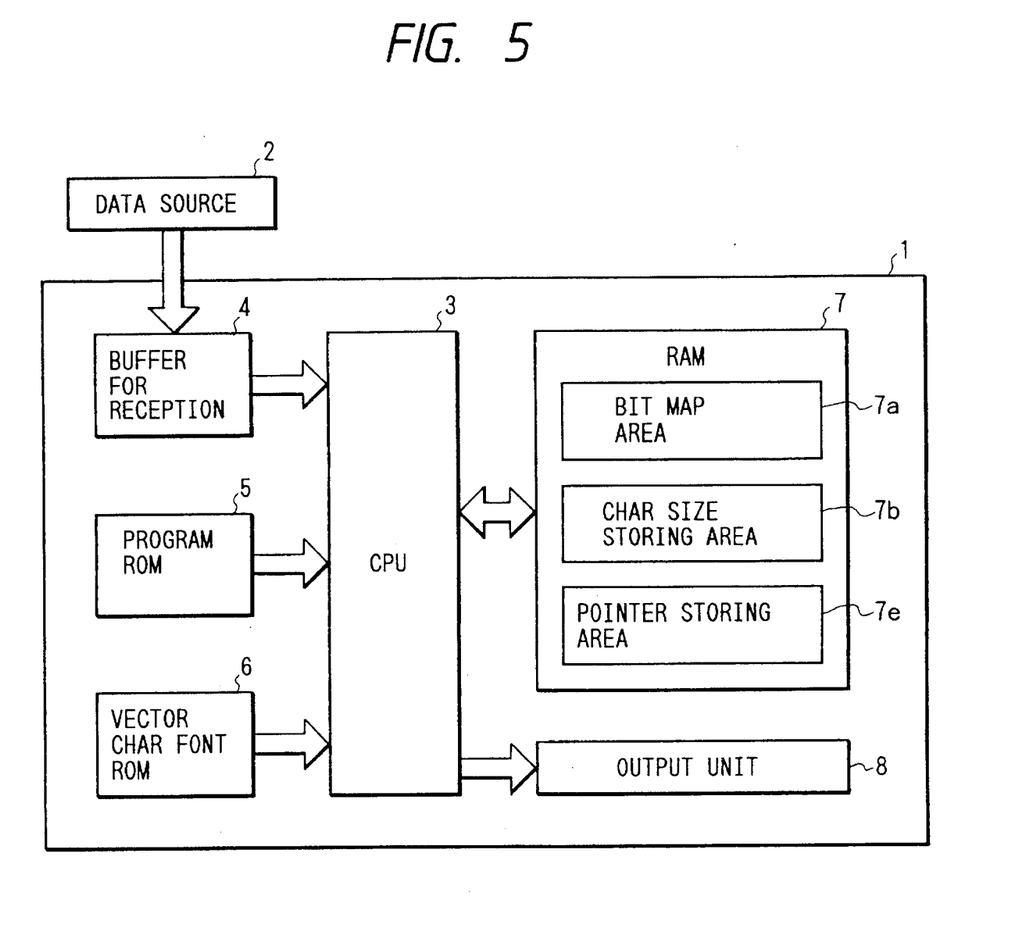
FIG. 5 is a block diagram of another embodiment of the present invention.

In the following there will be explained another embodiment of the present invention, with reference to FIG. 5 showing the features thereof.

Figure 6:
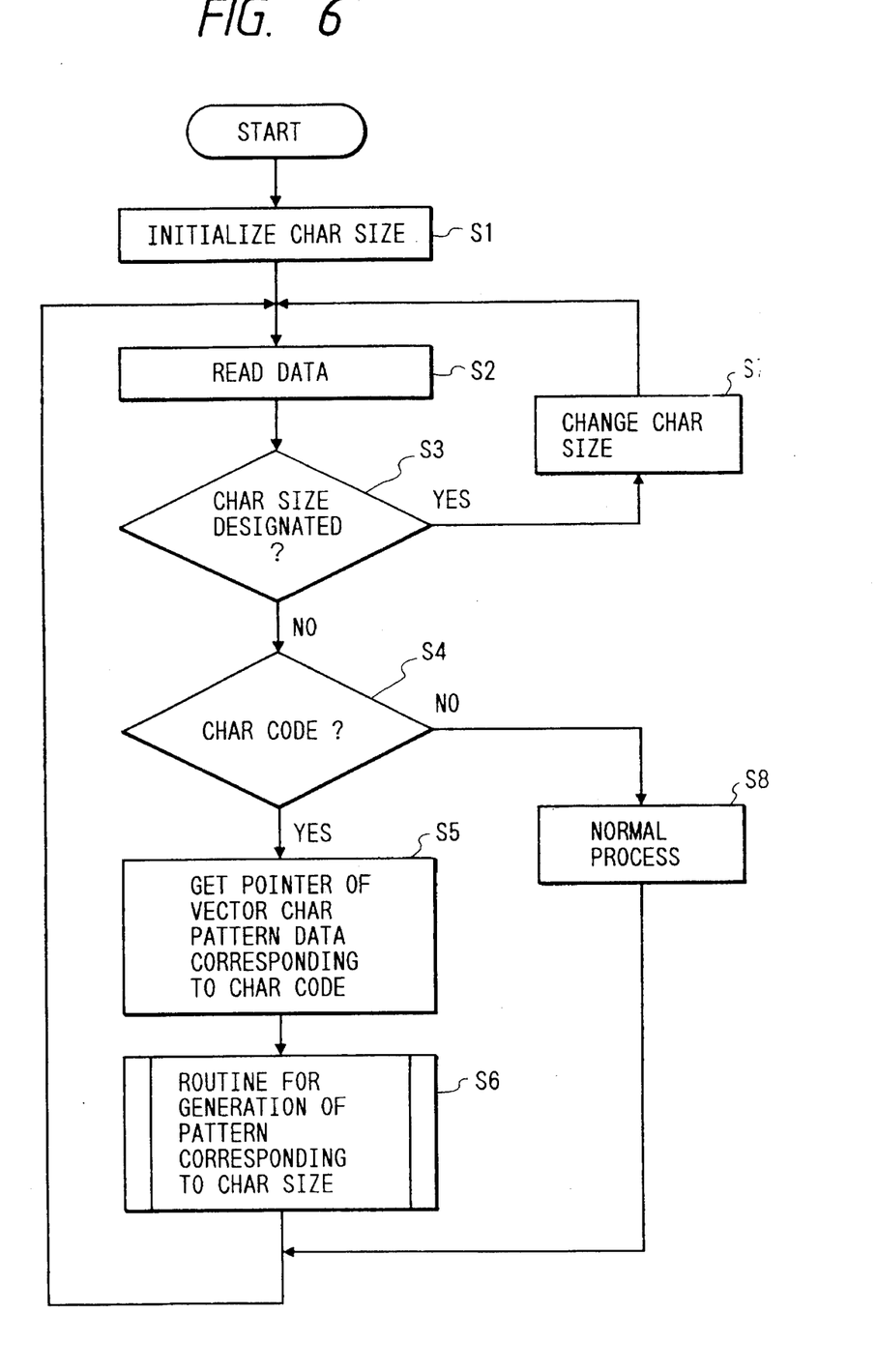
FIG. 6 is a main flowchart of the control sequence of said embodiment.
Figure 7:
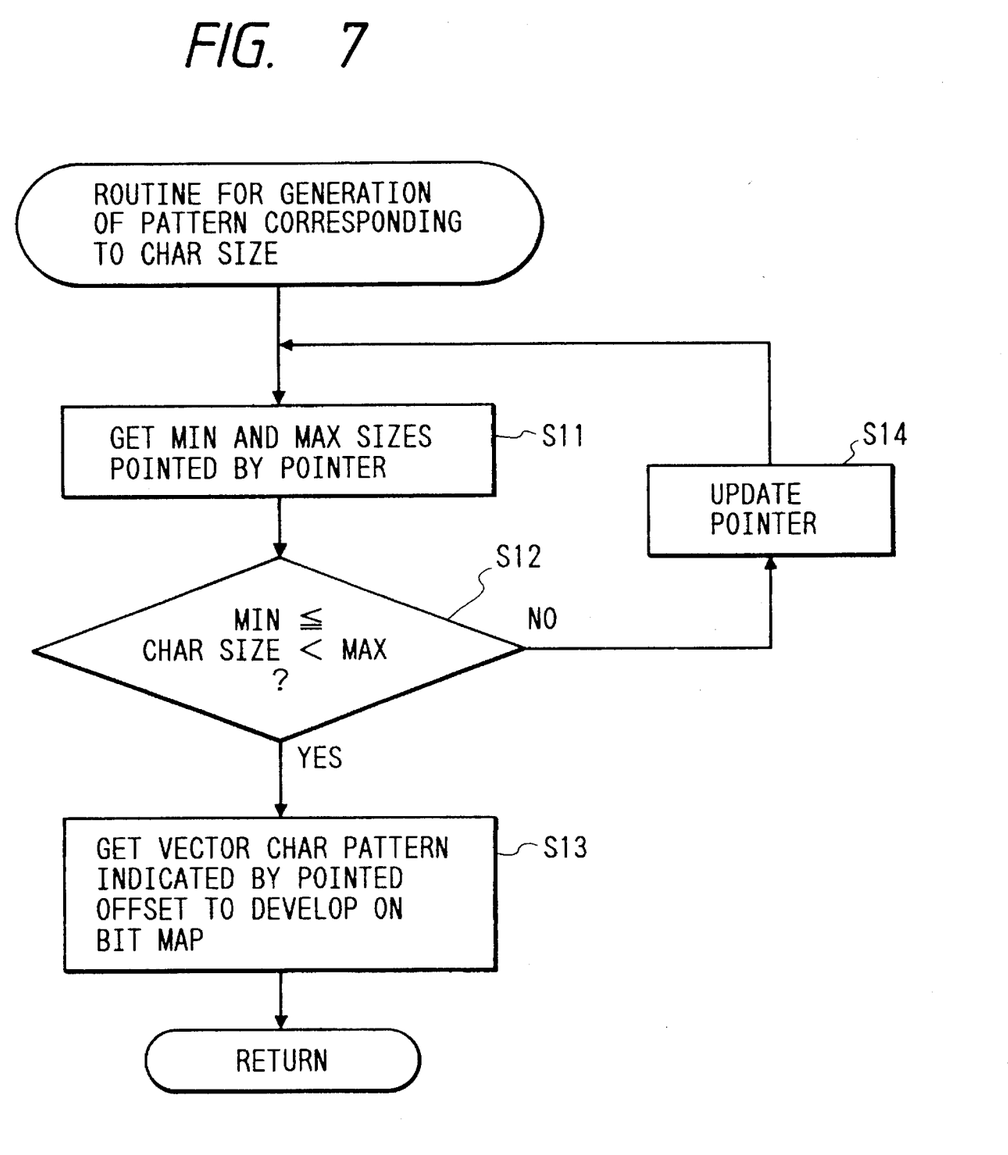
FIG. 7 is a subsidiary flowchart of the control sequence of said embodiment.

In FIG. 5 there are shown a main body of the printing apparatus; a data source 2 such as an external host computer; a CPU 3 for controlling the various units of the printing apparatus; a reception buffer 4 for storing data from said data source 2; a program ROM storing the programs corresponding to the flowcharts to be explained in relation to FIGS. 6 and 7; and a vector character font ROM 6 storing vector character (and design) patterns corresponding to the character codes (and patterns) entered into the reception buffer 4. Said vector character font ROM stores also a vector character pattern information part indicating the vector character pattern to be selected for each character size. A RAM 7 is used as a work area in the program execution of the CPU 3, and is provided with a bit map area 7a storing print data for character generation; a character size memory area 7b storing the character size to be currently printed; and a pointer memory area 7e for indicating the vector character pattern information part. An output unit 8 is provided for printing the print data stored in the area 7a.

Figure 8:
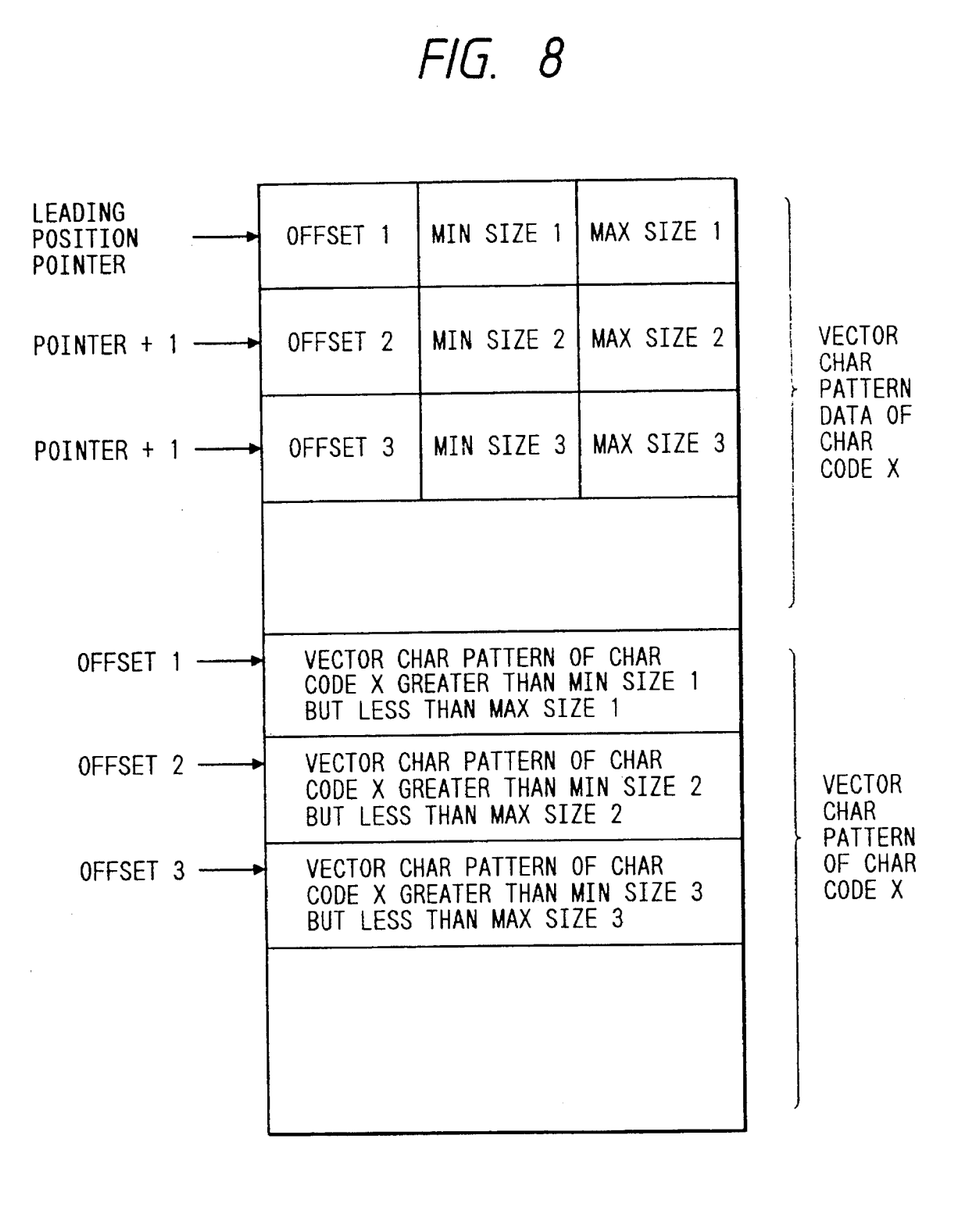
FIG. 8 is a schematic view of the format of vector character.

FIGS. 7 and 8 are flowcharts of the control sequence of a printing apparatus in which the present embodiment is applied. In the following the function of the present embodiment will be explained with reference to said flowcharts.

When the power supply is started to the apparatus, a step S1 stores an initial value of the character size in the character size memory area 7b. Then a step S2 receives the data from the data source 2, stores the received data in the reception buffer 4, and reads the data of a unit code from said reception buffer.

Then a step S3 discriminates whether said data are an instruction designating the character size, and, if not, a step S4 discriminates whether the input data are a character code or a control code (such as line feed or carriage return). If the input data are a character code, a step S5 searches the vector character pattern information part corresponding to said character code, and stores the top position pointer in the pointer memory area 7e. (FIG. 8 shows the vector character format of a character code x stored in the vector character font ROM 6, said format consisting of a vector character pattern information part and a vector character pattern part. The information in said vector character pattern information part is composed of plural sets of offset, minimum size and maximum size, and a character of a size equal to or larger than the minimum size but smaller than the maximum size is generated with the vector character pattern indicated by said offset. Also the vector character pattern part stores vector character patterns, corresponding to the character code x, for different sizes.

Then, in a step S6, the sequence enters a routine for generating a pattern corresponding to the character size, shown in FIG. 7. At first a step S11 fetches the pointer stored in the pointer memory area 7c and obtains the minimum size and maximum size indicated by said pointer. Subsequently a step S12 compares the character size stored in the character size memory area 7b with said maximum and minimum sizes, and, if the character size is at least equal to the minimum size but smaller than the maximum size, the sequence proceeds to a step S13 for obtaining the offset indicated by the pointer stored in the pointer memory area 7e and generating a character on the bit map area 7a with a vector character pattern indicated by said offset and with a character size stored in the character size designating area 7b, and the sequence returns to the main routine. On the other hand, if the discrimination of the step S12 turns out negative, a step S14 steps up the pointer of the memory area 7e to indicate a next set of offset, minimum size and maximum size, and the sequence returns to the step S11.

After the completion of pattern generating routine according to the character size in the step S6, the sequence returns to the step S2. Then, if the step S3 identifies a character size designating instruction, the sequence proceeds to a step S7 for storing the designating character size in the character size memory area 7b, and the sequence returns to the step S2. Also, if the step S4 does not identify a character code, then a step S8 executes an ordinary process (such as line feed, carriage return or form feed corresponding to the control codes), and the sequence returns to the step S2.

The foregoing explanation on the present embodiment has been limited to the application to a printing apparatus such as a page printer, but said embodiment is also easily applicable to a display apparatus equipped for example with a cathode ray tube.

As explained in the foregoing, in a character output apparatus for generating characters of an arbitrary size with vector character font, there are provided plural vector character patterns for each character, and the character is generated by selecting an optimum vector character pattern according to the designated character size. In this manner the character output of an arbitrary size can be obtained with high image quality.

What is claimed is:

1. A character output apparatus for generating characters of an arbitrary size with vector character fonts, comprising:

designation means for designating an output size of a character;

memory means for storing, for each vector character font, information for identifying the effective size range of character generation; and output means for executing character output, wherein in the event that the designated output size is outside the effective size range for a vector font, said output means executes character output using another vector font.

2. A character output method for generating characters of an arbitrary size with vector character fonts, using information stored for each vector character font, the stored information identifying the effective size range of character generation, the method comprising the steps of:

designating an output size of a character; and executing character output, wherein in the event that the designated output size is outside the effective size range for a vector font, the output step executes character output using another vector font.

3. An apparatus according to claim 2, wherein said memory means further stores information identifying a font style.

4. An apparatus according to claim 2, wherein said memory means further stores information identifying an alternative font.

5. A storage medium which stores a program used for generating characters of an arbitrary size with vector character fonts, using information identifying the effective size range of character generation, the program comprising the processes of:

designating an output size of a character; and executing character output, wherein, in the event that the designated output size is outside the effective size range for one vector font, the executing process executes character output using another vector font.

6. A storage medium according to claim 5, wherein the program further uses information identifying a font style.

7. A storage medium according to claim 5, wherein the program further uses information identifying an alternative font.

* * * * *

UNITED STATES PATENT AND TRADEMARK OFFICE
CERTIFICATE OF CORRECTION

PATENT NO. : 5,562,350

DATED : October 8, 1996

INVENTORS : Masakatsu Sakurai

It is certified that error appears in the above-identified patent and that said Letters Patent is hereby corrected as shown below:

COLUMN 2

Line 57, "Character" should read --character--.

COLUMN 3

Line 65, "but" should be deleted.

COLUMN 4

Line 23, "ROM" should read --ROM 6--;
Line 50, "(FIG. 8" should read --FIG. 8--.

COLUMN 6

Line 19, "claim 2," should read --claim 1, --;
Line 22, "claim 2," should read --claim 1, --.

Signed and Sealed this

Twenty-fifth Day of March, 1997

Attest:

BRUCE LEHMAN

*Attesting Officer*       *Commissioner of Patents and Trademarks*